(12) United States Patent
Hofmann et al.

(10) Patent No.: US 8,379,501 B2
(45) Date of Patent: Feb. 19, 2013

(54) DISC AUTHENTICATION BY GRAYSCALE IMAGE

(75) Inventors: Holger Hofmann, Thousand Oaks, CA (US); Alan Bruce Hamersley, Newbury Park, CA (US); John Matthew Town, Ojai, CA (US)

(73) Assignee: Thomson Licensing, Boulogne-Billcourt (FR)

( * ) Notice: Subject to any disclaimer, the term of this patent is extended or adjusted under 35 U.S.C. 154(b) by 317 days.

(21) Appl. No.: 12/227,463

(22) PCT Filed: Jun. 15, 2006

(86) PCT No.: PCT/US2006/023252
§ 371 (c)(1),
(2), (4) Date: Nov. 18, 2008

(87) PCT Pub. No.: WO2007/145626
PCT Pub. Date: Dec. 21, 2007

(65) Prior Publication Data
US 2009/0122684 A1   May 14, 2009

(51) Int. Cl.
*G11B 7/00* (2006.01)
(52) U.S. Cl. .................................. 369/109.01
(58) Field of Classification Search ............. 369/109.01, 369/109.02, 103, 47.19, 47.2, 53.21, 59.23, 369/59.24; 347/255, 264
See application file for complete search history.

(56) References Cited

U.S. PATENT DOCUMENTS

| | | | | |
|---|---|---|---|---|
| 5,065,377 A | * | 11/1991 | Spruit et al. | 369/100 |
| 5,607,188 A | | 3/1997 | Bahns et al. | |
| 5,608,717 A | * | 3/1997 | Ito et al. | 369/103 |
| 6,148,428 A | * | 11/2000 | Welch et al. | 714/752 |
| 6,385,255 B1 | * | 5/2002 | McLaughlin et al. | 369/18 |
| 6,438,692 B2 | | 8/2002 | Kato et al. | |
| 6,487,155 B1 | * | 11/2002 | Carson et al. | 369/59.13 |
| 2002/0036960 A1 | * | 3/2002 | Kashihara et al. | 369/47.26 |
| 2002/0054557 A1 | * | 5/2002 | Mouri et al. | 369/59.13 |
| 2002/0080706 A1 | * | 6/2002 | Fujimiya | 369/59.25 |
| 2002/0159367 A1 | * | 10/2002 | Ahn | 369/59.24 |

(Continued)

FOREIGN PATENT DOCUMENTS

| | | |
|---|---|---|
| EP | 00643391 | 3/1995 |
| EP | 0766864 | 4/1997 |

(Continued)

OTHER PUBLICATIONS

Phillps.:"Write Strategy", www.IP.PHILLIPS.com, (Online), May 22, 2006, pp. 1-2, XP002424409.

(Continued)

*Primary Examiner* — Thang Tran
(74) *Attorney, Agent, or Firm* — Robert D. Shedd; Robert B. Levy; Jeffrey D. Hale (57) ABSTRACT

The present principles provide a way to place a multilevel grayscale image, visible with the bare eye in the data area of an optical disc. This feature can be used to authenticate a legitimate disc, since the image features are lost when copying a disc either with a PC recording drive or by a pirate creating a data set to be used on a laser beam recorder to produce forged ROM discs. The modulation rules are selectively varied during disc writing in a way to change the distribution of pit/land lengths, so that the at least three (3) different diffraction properties are generated, and therefore produce at least three (3) distinct looks to the bare eye.

8 Claims, 5 Drawing Sheets

U.S. PATENT DOCUMENTS

| | | | |
|---|---|---|---|
| 2003/0002406 A1* | 1/2003 | Deguchi et al. | 369/47.3 |
| 2003/0048727 A1* | 3/2003 | Ando et al. | 369/59.24 |
| 2003/0172276 A1* | 9/2003 | Yntema et al. | 713/176 |
| 2004/0233816 A1* | 11/2004 | Jung et al. | 369/59.23 |
| 2005/0036767 A1 | 2/2005 | Morishima | |
| 2005/0052971 A1* | 3/2005 | Katata | 369/59.23 |
| 2005/0213463 A1* | 9/2005 | Sakagami | 369/59.11 |
| 2005/0232607 A1* | 10/2005 | Sakagami | 386/112 |
| 2005/0268180 A1* | 12/2005 | Sakagami | 714/701 |
| 2006/0203706 A1* | 9/2006 | Xu et al. | 369/275.4 |
| 2007/0291981 A1 | 12/2007 | Yntema | |

FOREIGN PATENT DOCUMENTS

| | | |
|---|---|---|
| JP | 2003323746 | 11/2003 |
| JP | 2004514236 | 5/2004 |
| JP | 2004355764 | 12/2004 |
| WO | WO0241316 | 5/2002 |
| WO | WO2004042729 | 5/2004 |
| WO | WO2005071677 | 8/2005 |

OTHER PUBLICATIONS

International Search Report, dated Apr. 18, 2007.
Standard ECMA-267, "120 mm DVD—Read Only Disk", 3rd Edition, Apr. 2001, Clause 22, pp. 30-31.

* cited by examiner

DISC AUTHENTICATION BY GRAYSCALE IMAGE

This application claims the benefit, under 35 U.S.C. §365 of International Application PCT/US2006/023252, filed Jun. 15, 2006, which was published in accordance with PCT Article 21(2) on Dec. 21, 2007, in English.

BACKGROUND

1. Field of the Invention

The present principles relate to optical disc authentication. More particularly, it relates to a method and apparatus for disc authentication by applying a grayscale image in the data area through modulation rule variation.

2. Description of the Related Art

The modulation rules applied when writing an optical disc are of integral importance when considering copying and unauthorized duplication of the same. Existing binary systems for imaging the data portion of an optical disc have been shown, for example by the Philips Electronics Pit O' Resc system. This system provides a modulation scheme and hardware that enables a binary image to be encoded on the data portion of the disc so as to generate an image on the same.

Binary images have significant limitations in the art, and more particularly do not provide sufficient flexibility so as to provide more than two diffraction patterns (i.e., more than 2 grayscale levels) in order to decrease forging and counterfeiting capability by adding significant more detail to the authentication images applied there to.

It is therefore desirable to have features on an optical disc which are easily visible with the bare eye and are hard to forge, so that it is easy to determine if it is a legitimate replicated disc or a pirated one.

SUMMARY OF THE INVENTION

The present principles are achieved in accordance with one implementation where the method includes modulating data to obtain bits for encoding first and second encoded region lengths on an optical disc, said modulating includes selecting at least three diffraction pattern in a data area on the optical disc and responsive to criteria based on the selected said diffraction patterns.

According to one embodiment, a counter is started upon the initiation of the recording of an optical disc. The counter is read and the varied modulation rules are applied when the counter reaches a multiple of a predetermined number, such as, for example, 2, 3, 4, 5, 6, 7 and 8.

According to yet a further embodiment, the method for applying grayscale imaging to the data area of an optical disc includes modulating the data to obtain a channel bit stream representative of a sequence of first and second encoded region lengths on the optical disc; said modulating further includes determining a number of 3T symbols from primary and secondary sync code tables each time there is a choice between primary and secondary sync code tables or state 1 and state 4 modulation tables; selecting at least three diffraction patterns; and assigning one selected diffraction pattern level for each of the following: 1) when the number of 3T symbols is higher in one of said primary and secondary sync code tables or state 1 and state 4 modulation tables; 2) when the number of 3T symbols is lower in one of the primary and secondary sync code tables or state 1 and state 4 modulation tables; and 3) when the number of 3T symbols is equal between the primary and secondary sync codes tables or state 1 and state 4 modulation tables.

In accordance with yet another embodiment, an apparatus includes a modulator for modulating data where a change in distribution of first and second encoded region lengths representative of bits from the modulated data generates at least 3 different diffraction patterns in the data portion of the optical disc.

A grayscale image controller having one input for receiving grayscale image data, one input connected to a pickup disc motor, and an output connected to the modulator, operates to synchronize the application of the modulation rule variations with geometrical positions on the disc.

The change in distribution includes an identification of different statistical properties in the data bytes and an assignment of a grayscale level according to the different statistical properties. Different ones of the different statistical properties are used depending upon the desired grayscale level. The different statistical properties of pit-land length distribution at least one of maximize and minimize a number of 3T symbols in the data bytes.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION OF PREFERRED IMPLEMENTATIONS

This description illustrates the present principles. It will thus be appreciated that those skilled in the art will be able to devise various arrangements that, although not explicitly described or shown herein, embody these principles and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
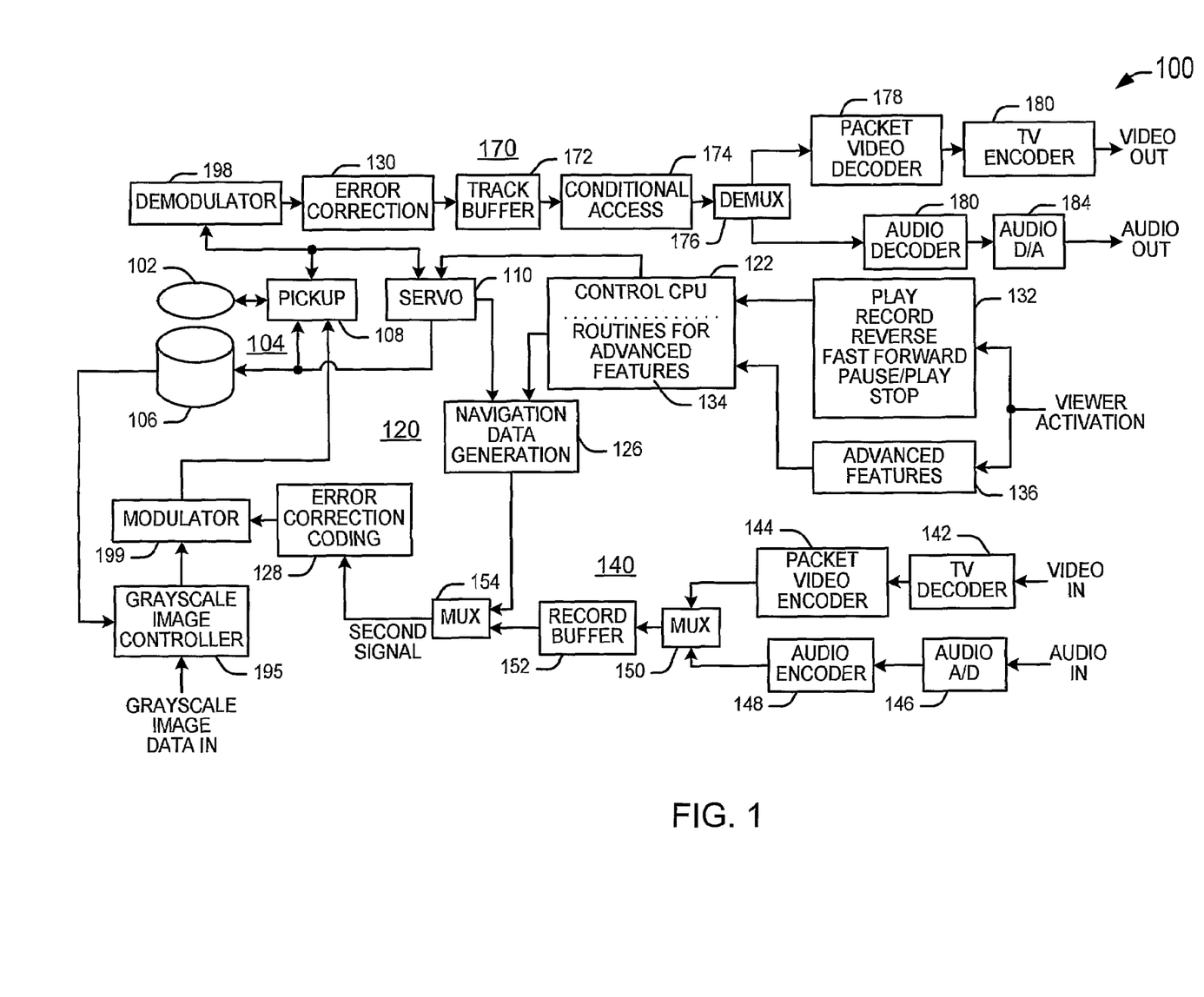
FIG. 1 is block diagram of an exemplary Digital Versatile Disc (DVD) recorder to which the present principles may be applied.

Turning to FIG. 1, an exemplary Digital Versatile Disc (DVD) recorder to which the present principles may be applied is indicated generally by the reference numeral 100. The DVD recorder 100 utilizes a recordable disk medium 102. The disk medium 102 is embodied as a DVD in the illustrated embodiment. In many instances, as will be noted, the disk medium can also be, for example, a compact disc (CD), a high definition digital versatile disc (HD DVD), a Blue Ray DVD, and so forth. Moreover, as is readily apparent to one of ordinary skill in this and related arts, the present principles are not applicable to optical disc recorders, but also to systems used for creating masters for read only memory discs, e.g., DVD-ROM. This so-called LBR (laser beam recorder) is similar to the illustrated recorder in FIG. 1, but obtains the record signal feed into block 128 from a hard disc drive.

The DVD recorder 100 is capable of writing onto and reading from recordable DVD media, in this example, a DVD 102. The device comprises a mechanical assembly 104, a control section 120, a video/audio input processing path 140, and a video/audio output processing path 170. The allocation of most of the blocks to different sections or paths is self-evident, whereas the allocation of some of the blocks is made for purposes of convenience and is not critical to understanding the operation of the device.

The mechanical assembly 104 includes a motor 106 for spinning the disk 102 and a pickup assembly 108 that is adapted to be moved over the spinning disk. The pickup 108 and the motor 106 are controlled by a servo 110. The servo 110 can receive a playback signal of data which can be read from a spiral track of the disk 102 as a first input. The playback signal also can be an input to an error correction circuit 130, which can be considered part of the control section or part of the video/audio output processing path.

When reading data from the disk 102, a laser on the pickup assembly 108 can direct laser light at an interior layer surface of the disk 102. Depending upon the data stored on the disk 102, the laser light can be mostly reflected or mostly absorbed. The pickup assembly 108 can interpret reflected light as one type of electrical signal while light absorbed by the interior layer surface of the disk 102 can be interpreted as a second type of electrical signal. In the preferred embodiment, transitions between reflectivity and non-reflectivity are mapped to a digital signal referred to as the playback signal which corresponds to the data stored on the disk 102.

By comparison, during recording, a laser on the pickup assembly burns spots onto a spiral track on the disk 102 in order to digitally record video and/or audio program material. More particularly, the disk 102, which can include at least one interior crystalline recording layer, can exhibit two distinctive states, amorphous or crystalline, each having different reflectivity characteristics. Those different levels of reflectivity can be detected by optical sensors in the pickup assembly 108.

Prior to recording, the interior recording layer of the disk 102 is in a crystalline state exhibiting high reflectivity. The light intensity of a laser beam can be modulated to write amorphous data marks on the surface of tracks in the interior crystalline recording layer. Specifically, the energy of a laser pulse can quickly raise the surface temperature of the interior crystalline recording layer above the layer melting point. Once above the melting point, the interior layer can transition from a crystalline state of high reflectivity to an amorphous state of low reflectivity. Subsequently, the rapid cooling of the layer prevents the molecular structure of the interior layer from reorganizing into a crystalline state. Hence, digital data can be mapped to a series of laser pulses which can write a digital code to the disk 102 which can correspond to the digital data.

Notably, depending upon capacity requirements, the disk 102 can have either one or two recordable sides. Additionally, the disk 102 can have multiple recordable layers per side. However, for purposes of understanding the present principles, the number of sides and layers is irrelevant. Moreover, in the event of a double-sided recording, it also is irrelevant whether the recording of both sides of the disk 102 occurs from one or both sides of the disk 102.

Returning now to FIG. 1, the control section 120 preferably includes a controller 122 and a navigation data generation circuit 126. The controller 122 supplies a first input signal to the navigation data generation circuit 126 and the servo 110 supplies a second input signal to the navigation data generation circuit 126. The servo can also be considered part of the control section 120. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

The controller 122 also preferably has access to the data included in the track buffer 172 and record buffer 152 as shown in FIG. 1. The controller 122 can delete, modify, and reformat video data stored in the track buffer 172 and record buffer 152 for the purpose of implementing the inventive arrangements. Control and data interfaces are also preferably provided for permitting the controller 122 to control the operation of packet video encoder 144 and audio encoder 148. Suitable software or firmware is provided in memory for the conventional operations performed by controller 122. In addition, program routines for the advanced features 134 are provided for controlling the controller 122.

A control buffer 132 for functions capable of being activated by a user indicates functions such as, e.g., play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate pause buffer 136 is provided to receive commands for performing the pause during record and playback function.

The video/audio input processing path 140 is a signal processing circuit for converting a conventional television signal, for example NTSC or PAL, into digitized packet data, for example MPEG-1 or MPEG-2, for digital recording by the DVD recorder 100. The input path 140 includes an NTSC decoder 142 and video encoder, for example MPEG-1 or MPEG-2, 144 for video in, and includes an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 includes a track buffer, or output buffer, 172, in which data read from the disk is assembled into packets for further processing. The packets are processed by conditional access circuit 174 that controls propagation of the packets through demultiplexer 176 and into respective paths for video and audio processing. The video is decoded by decoder 178, for example from MPEG-1 or MPEG-2, and encoded as a conventional television signal by TV encoder 180, for example NTSC or PAL. The audio is decoded by circuit 182, for example MPEG-1 or MPEG-2, and converted to analog form by audio digital-to-analog (D/A) converter 184. The output processing path 170 can be deemed to include the error correction circuit 130, as noted.

The DVD recorder 100 can represent a machine having, for example, but not limited to, a 1× read and 1× write capability. Such devices can typically have maximum data rates for recording or playing back of approximately 11 megabits/second.

A multi-level, varying rule based modulator 199 and/or demodulator 198 implements the varying rules based modulation in accordance with the present principles, so as to embed a second level code of the optical disc. As is shown, the modulator is disposed between the error correction coding circuit 128 and pickup 108, and the demodulator 198 is disposed between the pickup 108 and the error correction circuit 130. The modulator 199 includes an input for grayscale image controller signals from the grayscale image controller 195. The grayscale image controller has an input for the image data and an input from the pickup disc motor to synchronize the application of the modulation rule variations with the geometrical position on the disc.

As noted above, the present principles are directed to a method and apparatus for disc authentication by implementing grayscale images onto the data area of an optical disc. Advantageously, in accordance with the present principles, the grayscale image is lost if the optical disc is copied with an optical drive or is reproduced by a professional pirate on the user data level. Thus, the absence of the grayscale image may be used to indicate that an optical disc is illegitimate such as in the case of a pirated copy.

The present principles utilizes specific sets of rules to convert (modulate) data bytes into a channel bit stream, which is the sequence of pits and lands on an optical disc. In accordance with the present principles, different statistical properties of pit-land length distributions may be used to generate three (3) or more grayscale levels for imaging the data portion of the optical disc, without changing the readability performance of the data area since the proposed sets of modulation rules are compatible with the demodulation process used in standard optical disc drives.

All channel codes for optical discs provide a certain degree of redundancy to control the DC component of the bit sequences. Such DC component control is used to guarantee reliable data detection and a sufficient differential phase tracking signal for all possible bit combinations. This redundancy can also be used to select codewords with specific statistical run length distribution properties, resulting in different diffraction patterns that have a distinct look to the bare eye.

The modification to be performed for an optical disc (such as, e.g., a DVD) to obtain more than two different diffraction patterns for each synchronization (sync) frame can be implemented using the following procedure. Every time there is a choice between primary and secondary synchronization (sync) code tables or between state 1 and 4, it shall be determined which one produces more 3T symbols in the bit stream. If the grayscale level is 0, then the case with the higher number of 3T symbols is chosen. If the grayscale level is 1, then the case with the lower number of 3T symbols is chosen. If the number of 3T symbols is the same for both cases, then the usual Digital Sum Value (DSV) control rules are applied as specified. Since most of the time the number of 3T symbols is the same for both cases, the DSV control still works sufficiently. The preceding procedure is further described with respect to the embodiments disclosed in FIGS. 2a and 2b.

Figure 2A:
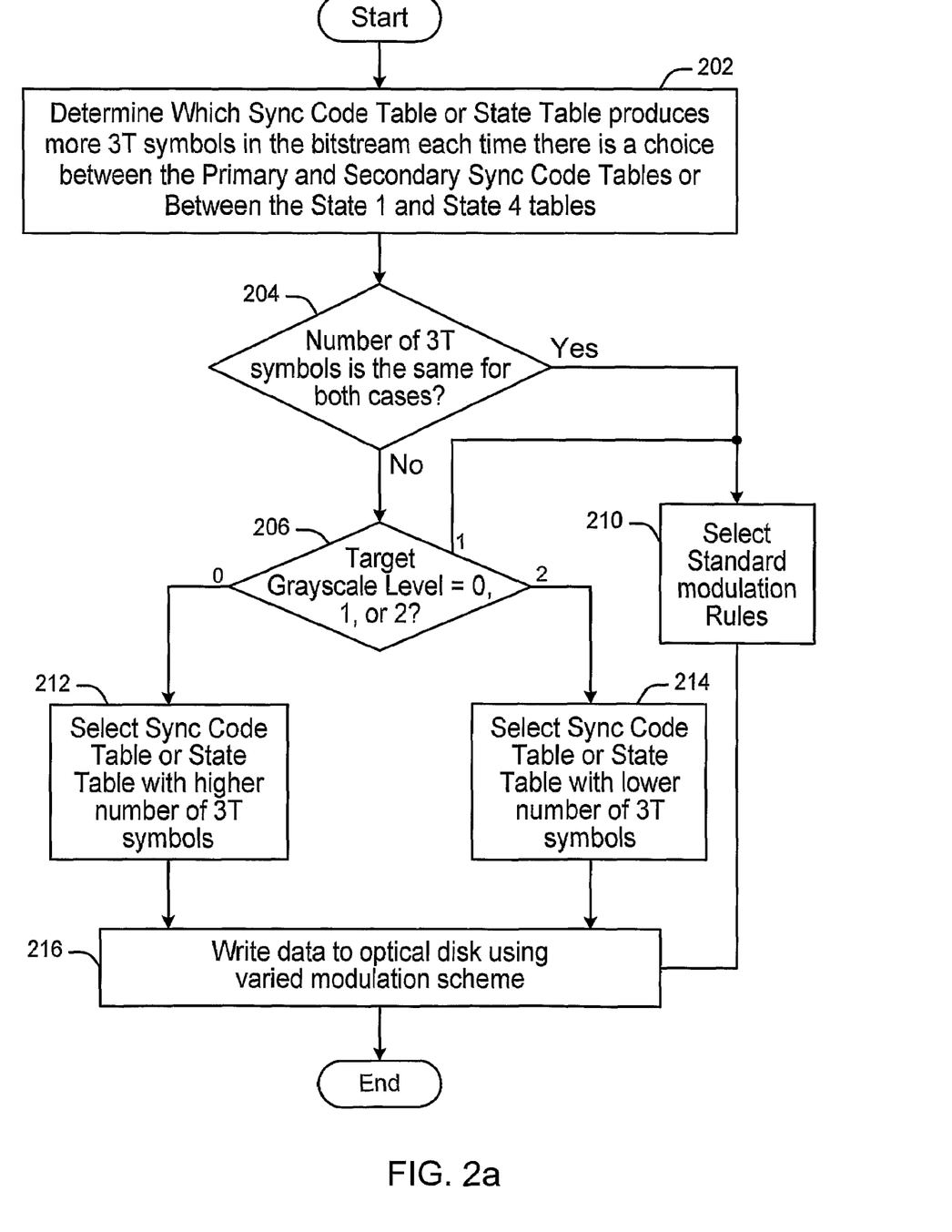
FIG. 2a is a flow diagram of an exemplary method for generating grayscale modulation having 3 grayscale levels according to an implementation of the present principles.

Turning to FIG. 2a, an exemplary method for generating 3 grayscale levels for imaging the data portion of an optical disc without altering the readability of the data recorded thereon is indicated generally by the reference numeral 200. The method 200 results in the generation of at least 3 different diffraction patterns, thus resulting in the production of 3 grayscale levels for imaging the data portion of the disc. It will be clear from the following that the presented such that the different sets of modulation rules are constructed so as to change or alter the distribution of pit/land lengths, which in turn results in different diffraction patterns that have a distinct look to the bare eye.

The method 200 includes a start block that passes control to a function block 202. The function block 202 determines which sync code table or state table produces more 3T symbols in the bitstream each time there is a choice between the primary and secondary sync code tables or between the state 1 and state 4 tables, and passes control to a decision block 204. The decision block 204 determines whether or not the number of 3T symbols is the same for both cases (i.e., whether the output of the function block 202 was indeterminate). When the answer is "yes", the standard DSV modulation rules are applied to that portion of the data recording. When the answer is "no" at decision block 204, a subsequent decision block 206 determines whether the target grayscale level is equal to "0", "1" or "2". When the grayscale level is to be 0, the sync code table or state table with higher than 3T symbols is selected to write the data to the disc (212). When the grayscale level is to be 1, the standard modulation rules are used.

When the grayscale level is to be 2, the sync code table or state table with lower than 3T symbols is use. Once this determination is made, the data is written to the optical disc using the varied modulation scheme (216).

The function block 212 selects the sync code table or the state table with the higher number of 3T symbols (or uses the standard Digital Sum Value (DSV) modulation rules when the output of the function block 210 is indeterminate), and passes control to the writing function block 216.

The function block 214 selects the sync code table or the state table with the lower number of 3T symbols (or uses the standard DSV modulation rules when the output of the function block 210 is indeterminate), and passes control to the writing function block 216.

The writing function block 216 places the modulated bits into the output buffer to be transferred to the pickup and passes control to an end block. This decision sequence (200) has to run once per primary code data or sync byte.

The preceding description is directed to modulation rules for embedding a 3 or more grayscale levels imaged onto the data portion of an optical disc by changing the diffraction patters of the pits and lands during the modulation process used during recording.

However, given the teachings of the present principles provided herein, one of ordinary skill in this and related arts will readily comprehend that the present principles are also readily applied to other optical disk modulation rules including, but not limited to, compact disc (CD), high definition digital versatile disc (HD DVD), and Blu-Ray Disc (BD) modulation rules.

In accordance with further embodiments of the present principles, additional grayscale levels can be achieved by using the modified modulation rules only in every other case (resulting in 5 grayscale levels), or in one of every three cases (resulting in 7 grayscale levels).

Figure 2B:
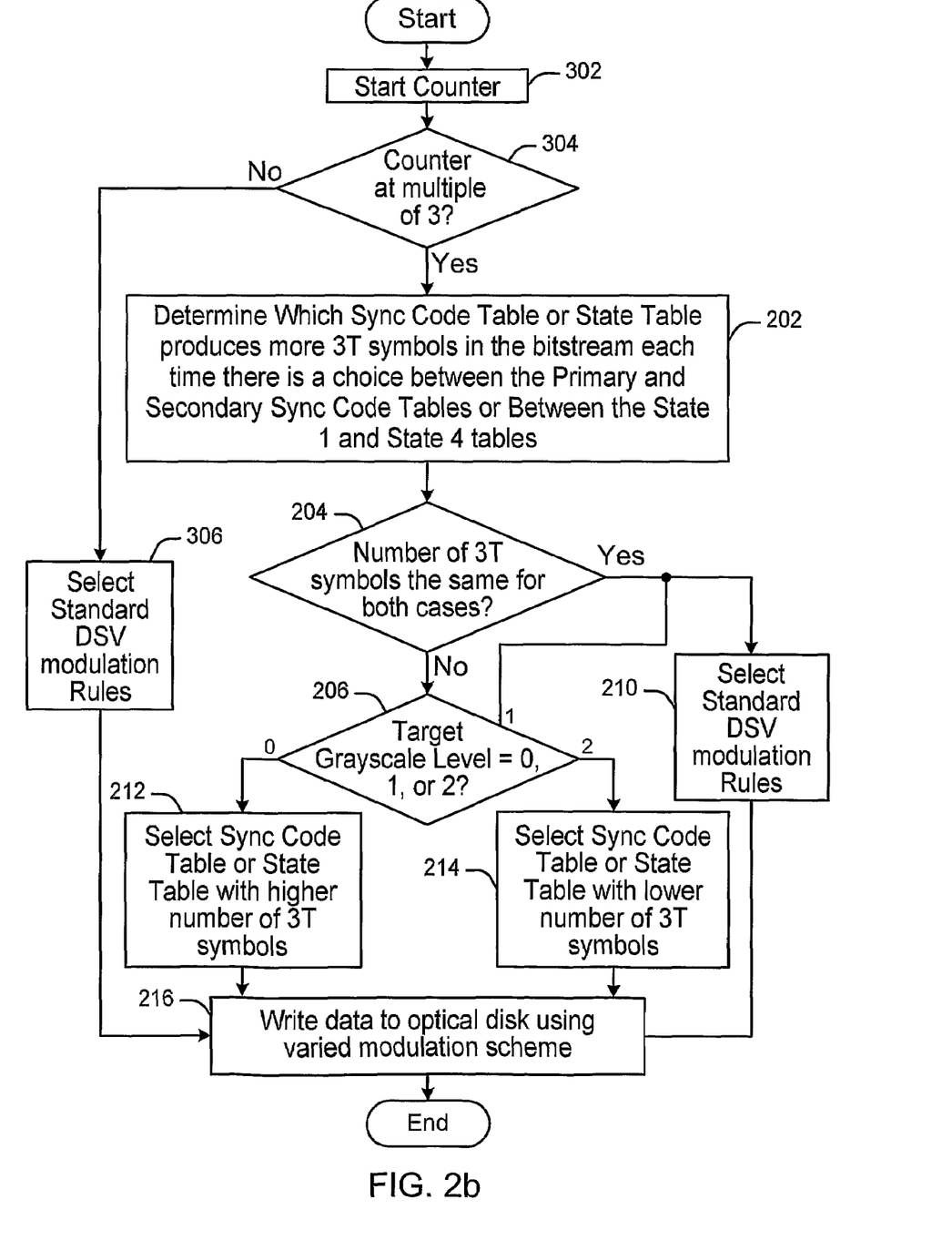
FIG. 2b is a flow diagram of an exemplary method for generating grayscale modulation having more than 3 grayscale levels according to an implementation of the present principles.

By way of example, FIG. 2b shows an embodiment of the present principles where a counter 302 and a decision block 304 are added to the beginning of the method. The counter is started, and decision block 304 determines whether the counter is at a multiple of 3 (e.g., in the case of 7 grayscale levels). When "yes" the decision block 304 passes operation onto the varied modulation method of the present principles. When decision block 304 says "no", the standard DSV modulations rules are selected and applied. The remainder of the process remains the same as described above with reference to FIG. 2a. Those of ordinary skill in the art will recognize that the interval or multiple number used by decision block 304 is shown as an exemplary implementation and can be can be changed or varied without departing from the spirit of the present principles.

Figure 3:
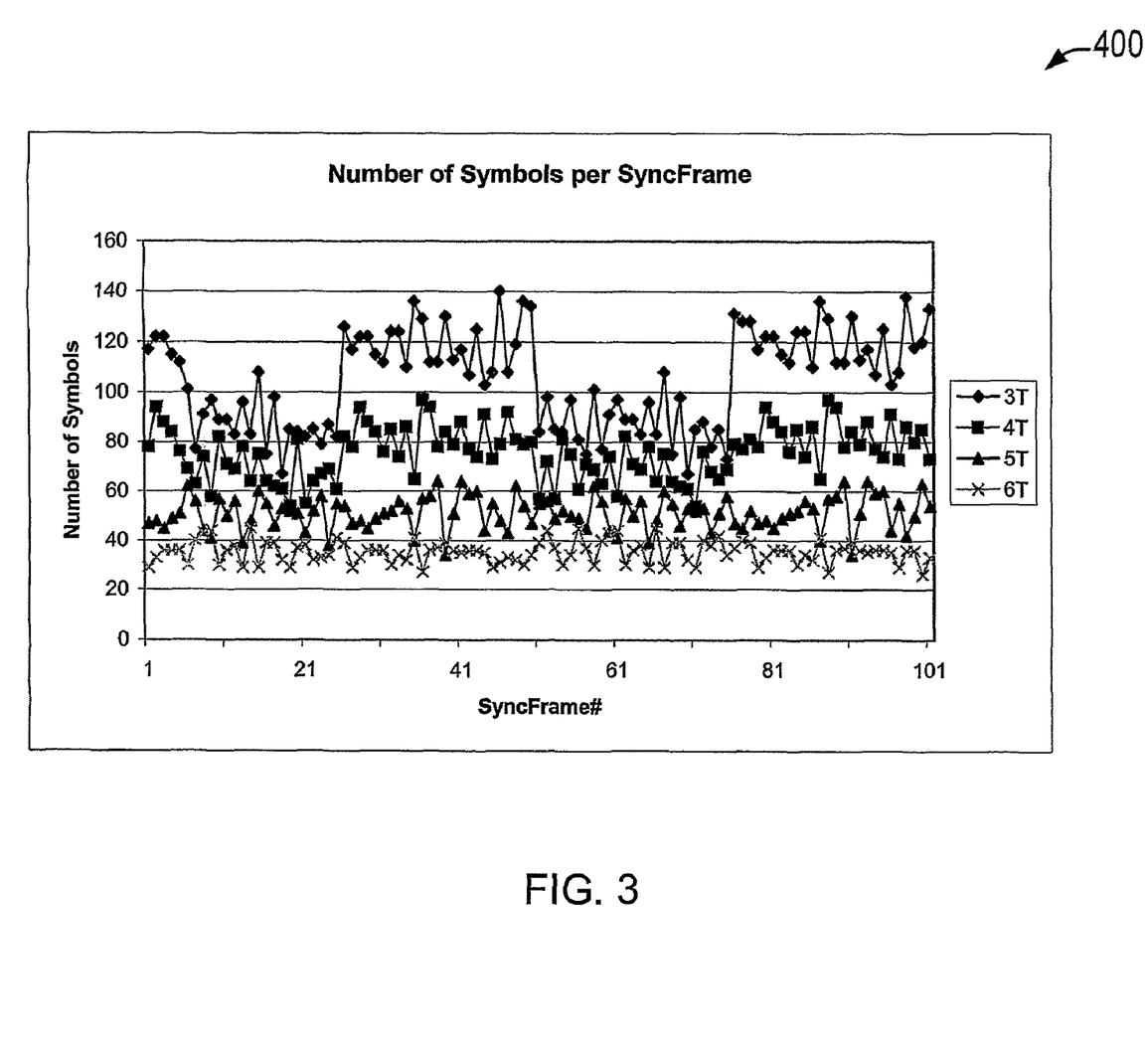
FIG. 3 is a graphical representation of the distribution of run lengths when applying the grayscale modulation rules according to the present principles.

Turning to FIG. 3, an exemplary graph for the distribution of runlengths when data modulation rule variation for the above described grayscale level 0 and 2 is applied to a DVD bitstream with grayscale image bit length corresponding to one sync frame of first level data is indicated generally by the reference numeral 400. In the graph 400, the horizontal axis denotes the number of consecutive sync frames, and the vertical axis shows the number of symbols with the various runlengths. It is easily seen that the number of 3Ts varies between higher and lower values. If the modulation process is conducted as described in the DVD specifications, then the average number of 3Ts per sync frame is approximately 105.

Figure 4:
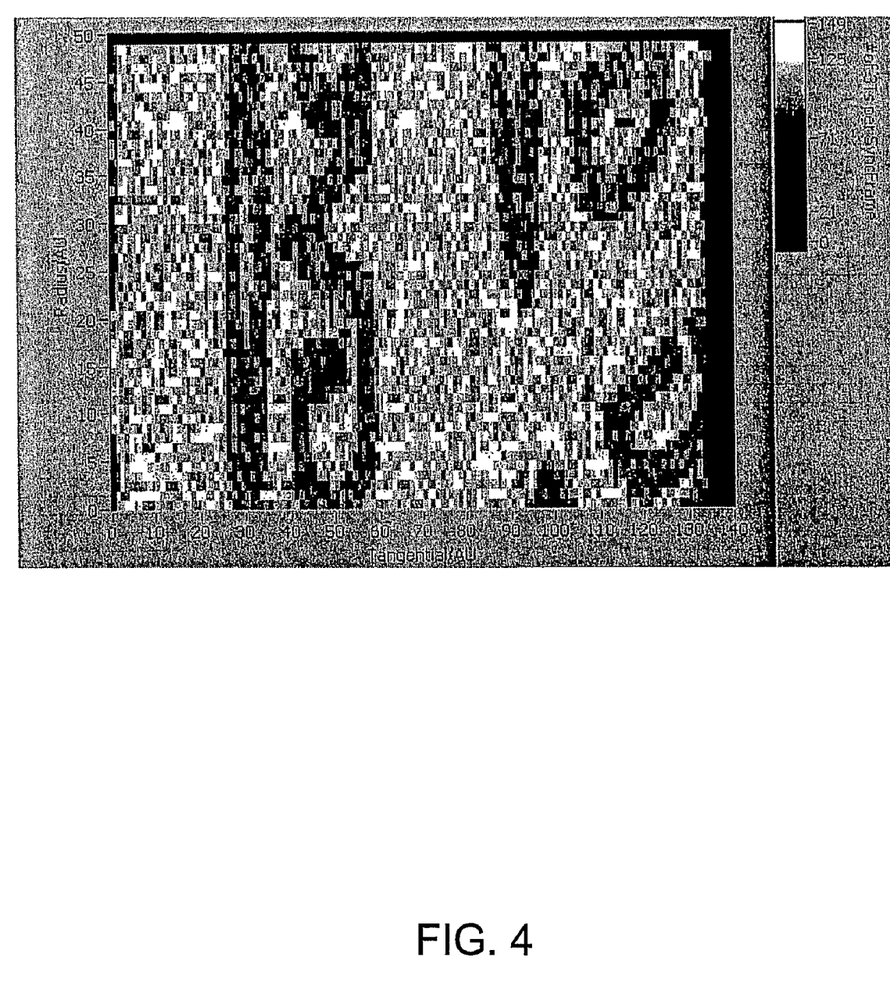
FIG. 4 is an exemplary two dimensional plot showing how a binary image can be created on a disc surface according to known methods.

FIG. 4 shows a two dimensional plot how a binary image can be created on the disc surface by coloring the 3T occurrence in different colors. This binary imaging has been performed by the known Philips Pit O Resc technology and shows the current state of the art for binary imaging the data portion of the disc. This concept is limited to binary imaging and shows conceptually that the 3 or more grayscale levels generation for data area imaging of the present principles can be performed as disclosed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

While there has been shown, described and pointed out fundamental novel features of the present principles as applied to preferred implementations thereof, it will be understood that various omissions, substitutions and changes in the form and details of the methods described and devices illustrated, and in their operation, may be made by those skilled in the art without departing from the spirit of the present principles. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present invention may be incorporated in any other disclosed, described or suggested form or embodiment as a general matter of design choice. It is the intention, therefore, to be limited only as indicated by the scope of the claims appended hereto.

The invention claimed is:

1. A method comprising:
    modulating image data;
    obtaining bits for encoding first and second encoded region lengths on an optical disc based on the modulated image data;
    generating at least three diffraction patterns based on the change in distribution of the obtained bits; and
    selecting the at least three diffraction patterns and recording that at least three diffraction patterns in a data area on the optical disc to create a visual image on the optical disc in response to criteria on the selected diffraction patterns.

2. The method of claim 1, further comprising
    determining which sync code table or modulation state table produces more 3T symbols in a bit stream from the data each time there is a choice between primary and secondary sync code tables or state 1 and state 4 modulation tables;
    determining numbers of the 3T symbols produced from the determined sync code table or modulation state table; and
    selecting standard DSV (digital sum value) modulation for a first selected diffraction pattern of the at least three diffraction patterns when the number of 3T symbols is the same for both primary and secondary sync code tables or state 1 and state 4 modulation state tables.

3. The method of claim 1, further comprising determining which sync code table or modulation state table produces more 3T symbols in a bit stream from the data each time there is a choice between primary and secondary sync code tables or between state 1 and state 4 modulation tables;
    determining numbers of the 3T symbols produced from the determined sync code table or modulation state table; and
    selecting the sync code table or modulation state table with higher numbers of 3T symbols for a second selected diffraction pattern of the at least three diffraction patterns.

4. The method of claim 1, further comprising
    determining which sync code table or modulation state table produces more 3T symbols in a bit stream from the data each time there is a choice between primary and secondary sync code tables or between state 1 and state 4 modulation tables;
    determining numbers of the 3T symbols produced from the determined sync code table or modulation state table; and
    selecting the sync code table or modulation state table with lower numbers of 3T symbols for a third selected diffraction pattern of the at least three diffraction patterns.

5. The method of claim 1, further comprising
    determining which sync code table or modulation state table produces more 3T symbols in a bit stream each time there is a choice between primary and secondary sync code tables or between state 1 and state 4 modulation tables;
    determining numbers of the 3T symbols produced from the determined sync code table or modulation state table;
    selecting standard DSV (digital sum value) modulation for a first selected diffraction pattern of the at least three diffraction patterns when the number of 3T symbols is the same for both primary and secondary sync code tables or state 1 and state 4 modulation state tables;
    selecting the sync code table or modulation state table with higher numbers of 3T symbols for a second selected diffraction pattern of the at least three diffraction patterns; and
    selecting the sync code table or modulation state table with lower numbers of 3T symbols for a third selected diffraction pattern of the at least three diffraction patterns.

6. A method comprising:
    modulating data to obtain a channel bit stream representative of a sequence of first and second encoded region lengths on an optical disc;
    said modulating further comprising:
        determining a number of 3T symbols from primary and secondary sync code tables each time there is a choice between primary and secondary sync code tables or state 1 and state 4 modulation tables;
        selecting at least three diffraction patterns; and
        assigning one selected diffraction pattern for each of the following: 1) when the number of 3T symbols is higher in one of said primary and secondary sync code tables or state 1 and state 4 modulation tables; 2) when the number of 3T symbols is lower in one of the primary and secondary sync code tables or state 1 and state 4 modulation tables; and 3) when the number of 3T symbols is equal between the primary and secondary sync codes tables or state 1 and state 4 modulation tables.

7. An apparatus comprising:
    a disc motor for rotating an optical disc;
    a modulator for modulating image data;
    a diffraction patterns generator for generating at least three different diffraction patterns based on a change in distribution of first and second encoded region lengths representative of bits from the modulated data; and
    an optical pickup for recording the at least three different diffraction patterns on the optical disc; and
    an image controller having one input for receiving image data, one input connected to the disc motor, and an output connected to said modulator for controlling the modulator.

8. An apparatus comprising:
    a modulator for modulating data;
    a diffraction patterns generator for generating at least three different diffraction patterns based on a change in distribution of first and second encoded region lengths representative of bits from the modulated data; and
    a recording device for recording the at least 3 different diffraction patterns on the optical disc;
    wherein said modulator is multi-level and varying rule based and alternates use of the modulation rules respectively having different statistical properties of the first and second encoded region length distributions and standard modulation rules for every other data byte to to provide 3 distinct grayscale levels in said diffraction patterns on said optical disc.

* * * * *